US009689705B2

(12) United States Patent
Newlin et al.

(10) Patent No.: US 9,689,705 B2
(45) Date of Patent: Jun. 27, 2017

(54) SYSTEMS AND METHODS FOR ELECTRONIC DISPLAY OF VARIOUS CONDITIONS ALONG A NAVIGATION ROUTE

(71) Applicant: MapQuest, Inc., Denver, CO (US)

(72) Inventors: Meghan Newlin, Boulder, CO (US); Austin Brown, Denver, CO (US); Johnathan Lansing, Westminister, CO (US); George Michael Ringrose, Hanover, PA (US); David Nesbitt, Port Deposit, MD (US)

(73) Assignee: Mapquest, Inc., Denver, CO (US)

( * ) Notice: Subject to any disclaimer, the term of this patent is extended or adjusted under 35 U.S.C. 154(b) by 149 days.

(21) Appl. No.: 14/473,420

(22) Filed: Aug. 29, 2014

(65) Prior Publication Data

US 2016/0061620 A1 Mar. 3, 2016

(51) Int. Cl.
*G01G 21/00* (2006.01)
*G01C 21/36* (2006.01)

(52) U.S. Cl.
CPC ................ *G01C 21/3676* (2013.01)

(58) Field of Classification Search
CPC .................................................. G01C 21/367

USPC ......................................................... 701/533
See application file for complete search history.

(56) References Cited

U.S. PATENT DOCUMENTS

| | | | | |
|---|---|---|---|---|
| 8,818,726 | B1 * | 8/2014 | Jones ................. | G01C 21/3676 701/527 |
| 2008/0234921 | A1 * | 9/2008 | Groenhuijzen .... | G01C 21/3415 701/118 |
| 2013/0332077 | A1 * | 12/2013 | Khetan ................ | G08G 1/0962 701/533 |

OTHER PUBLICATIONS

"How to Navigate." 12 pages. Retrieved from the Internet:<URL: http://wiki.waze.com/wiki/index.php?title=How_to_Navigate &oldid=75585>, accessed Sep. 16, 2014.

* cited by examiner

*Primary Examiner* — Adam Tissot

(57) ABSTRACT

Systems and methods are disclosed for generating and displaying a linear visual indicator of an entire route on a singular screen. One method includes calculating a route based on start and destination location and then determining various conditions along the calculated route. These conditions include, for example, traffic, weather, construction, road type, etc. This discloses generating and displaying a linear depiction of the full route and the navigation mapping screen, to provide the user with an easily understandable and accessible view of the full picture of route conditions.

20 Claims, 10 Drawing Sheets

SYSTEMS AND METHODS FOR ELECTRONIC DISPLAY OF VARIOUS CONDITIONS ALONG A NAVIGATION ROUTE

TECHNICAL FIELD

The present disclosure relates generally to graphical user interfaces for navigating content applications and, more particularly, to displaying route conditions on the graphical user interfaces.

BACKGROUND

In order to provide drivers with information related to a navigation route, traditional mapping services often calculate routes using preset methods based on known mapping information, such as POI locations, road locations, and physical distances between locations and nearby connected roads. Recently, some mapping services have started using real-time traffic data to help improve the accuracy of estimated arrival time.

Current mapping systems, to the extent real-time traffic data is provided at all, only display this data in a difficult view/interrupt section of the digital map. As a result, users may not have the ability to see real-time traffic as a whole or how many miles a particular traffic condition may persist. Further, a user may not have information about real-time traffic data within enough time to select a more optimal route before beginning their trip. In addition, most mapping systems are relatively static and "forgetful." In other words, they only provide a simple function of comparing a current location with a destination at a particular moment (usually real-time), and determining and displaying one or more shortest and/or fastest routes. This may lead to user dissatisfaction with the mapping services, lost time, and increased fuel consumption.

Accordingly, a need exists for systems and methods for generating and displaying on a singular, easily viewable screen a visual representation of conditions along the route. More specifically, a need exists for systems and methods for a route progress bar that allows the user to see a linear representation of traffic conditions along a calculated route.

SUMMARY OF THE DISCLOSURE

Embodiments disclose systems and methods for a visual representation of the various conditions for the full length of the route.

According to certain embodiments, methods are disclosed for providing a computer-implemented method for providing a visual representation of conditions along a calculated route, the method comprising: receiving a start location and a destination location; calculating a route based on received start and destination locations; scaling the calculated route to the dimensions of a linear visual indicator; receiving or calculating at least one condition associated with each of one or more of a plurality of points along the calculated route; and generating and displaying (1) an electronic map including the calculated route and (2) the linear visual indicator including visual representations of the at least one condition associated with the one or more points along the calculated route.

Aspects of the disclosure relate to one or more of: the at least one condition is a weather condition; the linear visual indicator, comprises two bars; the at least one condition is a traffic condition; receiving current average speeds for each of the one or more points along the calculated route for calculating the at least one condition; calculating the difference between the received current average speeds for each of the one or more points and the speed limits for each of the one or more points; calculating the difference between the received current average speeds for each of the one or more points and the historical average speeds for each of the one or more points; determining whether the difference between the received current average speeds for each of the one or more points and the historical average speeds for each of the one or more points is less than a first threshold; if the difference is less than a first threshold for a point, the point is designated a first state and a first visual representation is displayed on the linear indicator; if the difference is not less than a first threshold, determining whether the difference between the received current average speeds for each of the one or more points and the historical average speeds for each of the one or more points is less than a second threshold; if the difference is less than a second threshold for a point, the point is designated a second state and a second visual representation is displayed on the linear visual indicator; if the difference is not less than a second threshold for a point, the point is designated a third state and a third visual representation is displayed on the linear visual indicator; receiving a stop location; and calculating a route based on the start location, the stop location, and the destination location; receiving an updated current location of a user device; and determining whether the updated location is on the calculated route, by, if the current location is on the calculated route, moving a position indicator to a corresponding length along the linear visual indicator and designating the points to one end of the position indicator as a traversed state, and if the current location is not on the calculated route, calculating a new route based on the current location and received destination location; the linear visual indicator is interactive; receiving a request from a user for additional information; obtaining additional information; and displaying the additional information; the additional information is alternative routes; the additional information is a distance a state persists.

According to certain embodiments, systems are disclosed for providing a linear visual indicator of route conditions. One system includes a data storage device storing instructions for providing navigation control across multiple layers of content views within a mobile application; and a processor configured to execute the instructions to perform a method including: receiving a start location and a destination location; calculating a route based on received start and destination locations; scaling the calculated route to the dimensions of a linear visual indicator; receiving or calculating at least one condition associated with each of one or more of a plurality of points along the calculated route; and generating and displaying (1) an electronic map including the calculated route and (2) the linear visual indicator including visual representations of the at least one condition associated with the one or more points along the calculated route.

According to certain embodiments, a computer readable medium is disclosed as storing instructions that, when executed by a computer, cause the computer to perform functions to: receiving a start location and a destination location; calculating a route based on received start and destination locations; scaling the calculated route to the dimensions of a linear visual indicator; receiving or calculating at least one condition associated with each of one or more of a plurality of points along the calculated route; and generating and displaying (1) an electronic map including the calculated route and (2) the linear visual indicator including visual representations of the at least one condition associated with the one or more points along the calculated route.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

The present disclosure is directed to overcoming one or more of the above referenced issues. Specifically, the present disclosure is directed to systems and methods for generating and displaying a linear representation of various conditions along a calculated navigation route. The present disclosure allows a user to view, displayed on a singular screen, both a mapped route and a linear display of route conditions (including, but not limited to, the current traffic) for the entire route. Reference will now be made in detail to the exemplary embodiments of the disclosure, examples of which are illustrated in the accompanying drawings. Wherever possible, the same reference numbers will be used throughout the drawings to refer to the same or like parts.

Referring now to the figures, FIGS. 1-6 is an illustration of different views 100, 200, 300, 400, 500, and 600 of a GUI 101 having an electronic map 102 and a linear visual indicator 104. The GUI 101 may be provided by a mapping service provider or any other entity and may include various graphical icons and visual indicators. The GUI 101 may be presented on any suitable electronic device having a display. In some embodiments, the GUI 101 may be accessible (e.g., for viewing and interacting) on a website accessible by an electronic device. In other embodiments, the GUI 101 may be accessible on a mobile navigation application of an electronic device. In such embodiments, the view of the electronic map 102 may be automatically updated or panned over based on detecting, via GPS or in any other suitable manner, the current location of the electronic device.

The digital map 102 may be of any suitable form and/or type of view, such as a map view, satellite view, live traffic view, etc. The digital map 102 may be any suitable size to be displayed by an electronic device on the GUI 101. The view of the digital map 102 may be manipulated in any suitable manner, (e.g., zoomed in and out, rotated, panned, etc.). The digital map 102 may be of any scale, e.g., transcontinental, continental, region, state, city, neighborhood, campus, etc. The digital map 102 also may include various identifiers, e.g., geographic markers, landmarks, road names, etc. and may be automatically electronically updated.

Figure 3:
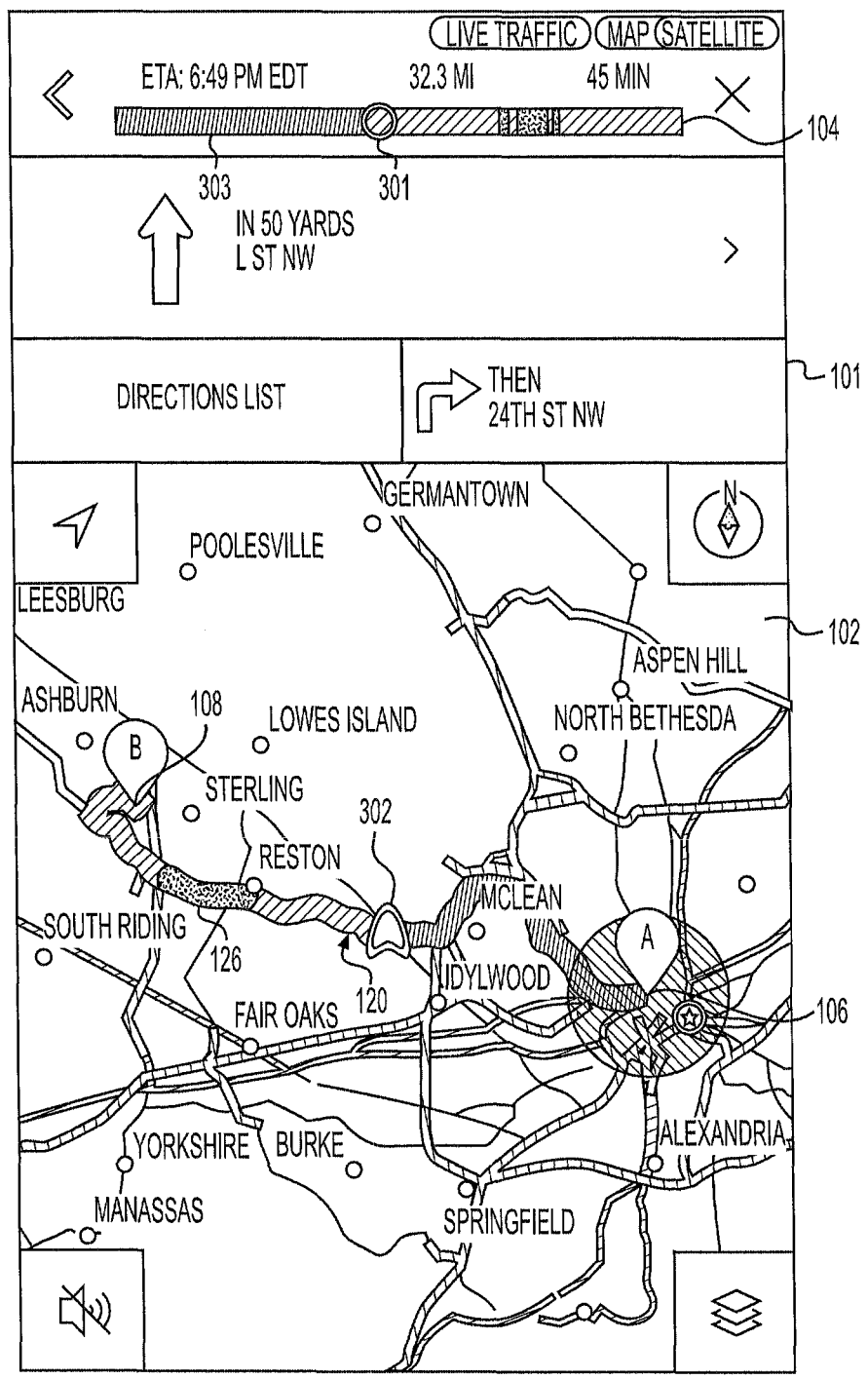
FIG. 3 is a schematic view of an exemplary GUI of a route on a digital map and a linear visual indicator corresponding to the route, once an updated location is determined to be different than the start location, according to an exemplary embodiment of the present disclosure.

The digital map 102 may include a route 120 between a start location 106 and one or more destination locations 108 (and/or stop location 302 in FIG. 3). The start and/or destination locations 106, 108 may be any locations identifiable on the digital map, for example, a specific address (e.g., 123 Green St. Any town, Calif.), point of interest ("POI") location (e.g., Wrigley Field), general geographic location (e.g., Denver, Colo.), intersection (e.g., $1^{st}$ St. and Broadway, exit 29A), etc. The start and destination locations 106, 108 may be any distance from each other and/or any direction relative to each other. The route 120 may be determined or received in any way.

The route 120 may be along one or more portions of local streets, highways, bridges, etc. The route 120 may be traversed in any suitable manner, e.g., via motor vehicle, bicycle, foot, public transit, plane, boat, etc. The route 120 also may include various visual indicators to identify various attributes of the route 120. For example, traffic flow along the route 120 at various times may be identified using different colors or combination of colors, visual effects (e.g., animation, pop-up notes, etc.), etc. Road restrictions, tolls, bridge heights, construction, etc., also may be shown along the route 120.

The GUI 101 may display one or more linear visual indicators 104. A linear visual indicator may be any suitable size, shape, color, etc. For example, the FIGS. 1-6, show the linear visual indicator 104 as a linear or bar shaped representation of various conditions along the route. The linear visual indicator 104 may be parallel to the top of GUI 101 and/or digital map 101. The linear visual indicator 104 may be elongate, i.e., substantially longer than it is wide. For example, the length of linear visual indicator 104 may be between ⅓ the width and the entire width of GUI 101, and the width of linear visual indicator 104 may be between 1/100 and ⅓ the length of the GUI 101.

The linear visual indicator 104 may be divided into representative, smaller segments. In the example illustrated in FIG. 1, these segments may be rectangles. Each rectangle may represent a segment of route 120. These segments may include different crosshatching, shades, colors, or a combination thereof.

Figure 1:
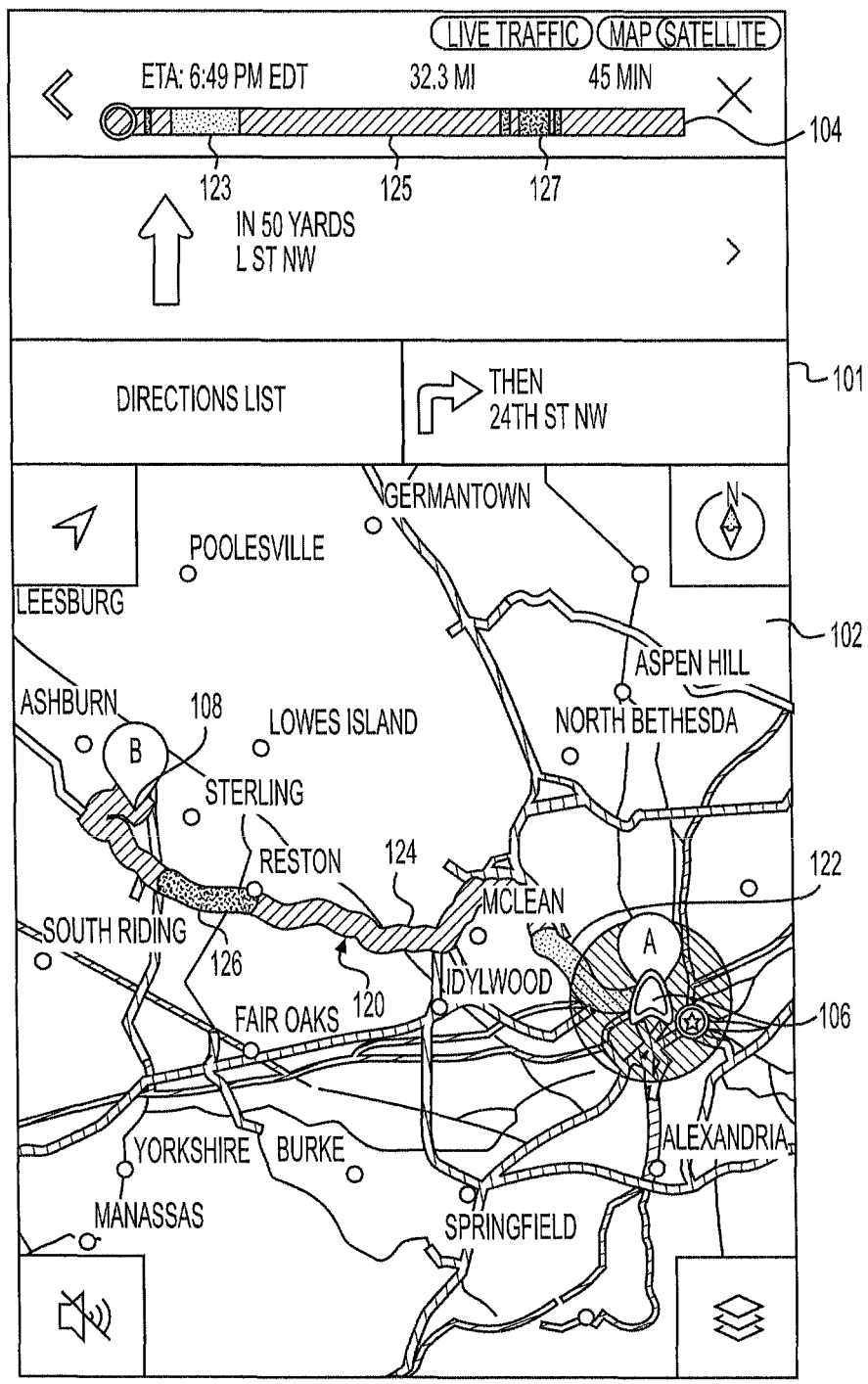
FIG. 1 is a schematic view of an exemplary graphical user interface (GUI) of a route on a digital map and a linear visual indicator corresponding to the route, according to an exemplary embodiment of the present disclosure.

The linear visual indicator 104 may be displayed above digital map 102 in GUI 101. As shown in FIG. 1, directions, including the next direction for the navigation route may be displayed between digital map 102 and linear visual indicator 104. The GUI 101 may include additional information about the route, including but not limited to the estimated time of arrival ("ETA"), the length of the route 120, and the estimated travel time for the route 120. In the example illustrated in FIG. 1, ETA, length of route, and estimated travel time are all displayed (from left to right) above linear visual indicator 104. In some implementations, only some of this information is displayed. In other implementations, this information is scrolled above linear visual indicator 104. For example, the display of this information may be on a loop, only displaying ETA, length of route, and estimated travel time for a few seconds at a time.

The linear visual indicator 104 may include various visual indicators to identify various attributes of the route 120. In some implementations, traffic flow may be represented using different colors or combination of colors, symbols, visual effects (e.g., animation, pop-up notes), etc. The conditions represented along the linear visual indicator 104 may include, for example, traffic, weather, time of day (e.g., day/night), construction, type of road (e.g., highway/toll road/one-way), change in speed limit, upcoming directions related to route, areas where other users have lost service, elevation, safety and police factors (e.g., police presence, speed cameras, red-light cameras, stopped cars, school zones), exercise accomplishments (e.g., estimated calories burned, estimated split times, etc.) or any other conditions. The linear visual indicator may illustrate current conditions (e.g., the current weather at any point on the route) or estimated conditions for the estimated time of arrival at that point (e.g., it is currently raining in Nashville but the forecast for when the user is estimated to arrive in Nashville is sunny, so the linear visual indicator will indicator sunny weather for that point along the route.) The linear visual indicator 104 may also display the condition of other users. For example, an indicator may appear on the linear visual indicator 104 to represent where other users are along route 120. This may be useful for caravans and/or road trips. It may also be used to see if any of the user's friends are in the neighborhood or the another user's ETA at a meeting place. The linear visual indicator 104 may also display conditions related to exits along route 120. For example, linear visual indicator 104 may indicate the density of points of interest ("POIs") at an exit and/or whether there is a specific category of POIs off an exit (e.g., gas stations).

As an example, the linear visual indicator 104 of FIG. 1 may indicate the current traffic conditions for route 120 from a user input start location 106 in Washington D.C. to a user input destination location 108 in Dulles, Va. It should be noted that the start position 106 may be a detected current location of a user device. The calculated or selected route 120, may be scaled to the size of the linear visual indicator 104. For example, if the route 120 is 60 miles long, and the linear visual indicator 104 is 6 cm long, each millimeter may represent one mile of the route. The millimeter on the far left of linear visual indicator 104 may represent the distance from the start location 106 to the first mile of the route and the millimeter of the far right may represent the distance between the last mile and destination location 108.

The current traffic for each point along route 120 may be determined in any way. In one example, raw data related to the current speed at one or more points along the route may be provided by a third party. Similarly, at each point, information related to historic or average speeds or the speed limits for each point along route 120 may be obtained from a third party or a database. The difference between the current speed and the historic/average speeds or posted speed limits may be calculated. If it is determined that the difference at a particular point along the route is less than a first threshold (e.g., the speed limit is 35 M.P.H, the average current speeds is 34 M.P.H., and the first threshold is 5 M.P.H.), that point may be designated a first state. In the example of FIG. 1, point 122 along route 120 may have a difference less than a first threshold, so the first state may be "normal" traffic, and the color at point 122 may match the color at corresponding point 123 on the linear visual indicator 104. If the difference between the current speed and the historic/average speeds or speed limit is calculated to be greater than the first threshold, that point may be designated a second state. In some implementations, the second state may represent slow traffic. For example, if the current average speeds of user devices are travelling at 9 M.P.H. less than the historic average or posted speed for a particular point, 124, along the route, that point may be designated as the second state and/or "slow" traffic. In such an example, point 124 may be designated as second state and a desired color, crosshatching and/or shading may be displayed at point 124 on digital map 102 and on corresponding point 125 on linear visual indicator 104. If second state is "slow," then color may be orange or yellow. Further, if it is determined that the difference at a particular point along the route is greater than a second threshold (e.g., the second threshold is 10 M.P.H., the average current speed is 7 m.ph. and the speed limit is 35 M.P.H.), that point may be designated a third state. In the example of FIG. 1, point 126 along route 120 may have a difference greater than the second threshold and the third state may be "stopped," or "stop and go" traffic. In this example, point 127 in the electronic map 102 may be red in color. Corresponding point 126 on the linear visual indicator 104 may be red in color, indicating the traffic may be "stop and go" at this location along route 120. It should be noted that the states and thresholds provided herein are merely exemplary, there may be as many states and thresholds as desired. There may be any number of states, each state corresponding to one of more speed or traffic thresholds. In FIG. 1, each state is represented in linear visual indicator as a shade. Each state may also be represented by in any way including, but not limited to, different colors, crosshatching, symbols, width of a bar, etc.

Figure 2:
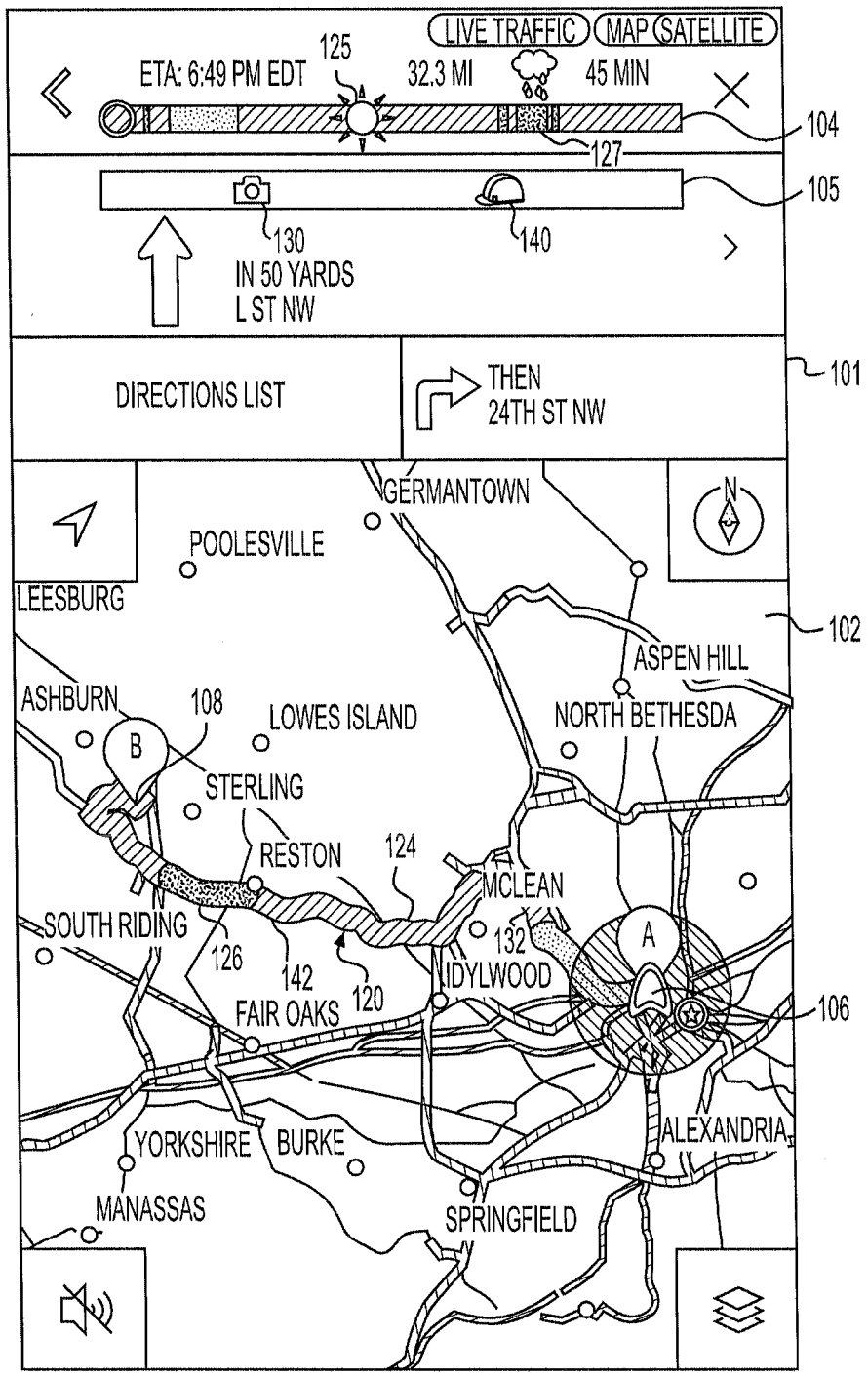
FIG. 2 is a schematic view of an exemplary GUI of a route on a digital map and two linear visual indicators corresponding to the route, according to an exemplary embodiment of the present disclosure.

FIG. 2, shows a view 200 of the digital map 102 and linear visual indicators 104 and 105 of the GUI 101. As shown in FIG. 2, view 200 shows multiple linear visual indicators, each representing different route conditions. In this example, linear visual indicator 104 illustrates both the traffic conditions along route 120 (as further described above, with respect to FIG. 1) and the weather conditions. Linear visual indicator 105 may illustrate any additional road or traffic conditions, such as the presence of a speed camera 130 and/or construction 140. It should be noted that there may be any number of linear visual indicators and each indicator can represent one or more conditions. It should also be noted that the user may have the ability to choose the number of linear visual indicators displayed on the GUI, which conditions may be represented, and which conditions are illustrated on each linear visual indicator. In one example, a user may add a custom "layer" to linear visual indicator 105. If the user sets a "Trader Joe's" layer, then indicators representing the locations of Trader Joe's along the route, may be displayed on or by linear visual indicator 104.

The weather conditions represented on linear visual indicator 104 may be the current weather for that point along the route 102. In certain embodiments, a weather indicator may be located at a point along the linear visual indicator. For example, the sun symbol 125 on the linear visual indicator 104 may indicate that the current weather us sunny at corresponding point 124 on the digital map 102. Additionally and alternatively, weather indicator located at point 127 on linear visual indicator 104 may be a rain symbol, indicating that it may be raining when the user is estimated to arrive at corresponding point 126 along the route 120. Similarly, linear visual indicator 105 may display various other route conditions. For example, the camera symbol 130 along linear visual indicator 105 may represent a speed camera at corresponding point 132 along the route. The construction hat symbol 140 along linear visual indicator 105 may represent a construction zone at corresponding point 142 along route 120.

It should be noted that these symbols may be interactive. For example, if the user selects the sun symbol 124, additional information may be provided. The GUI may open a weather website for the location, the future weather may be provided or additional information, for example, the temperature, humidity, or pollen levels, may be provided. Similarly, the construction symbol 140 may be selected to provide more details regarding the construction, like, for example, the length of the construction, whether and how many lanes are closed, scheduled work hours, a number of days construction is estimated to take, etc.

FIG. 3, shows a view 300 of the digital map 102 and the linear visual indicator 104 of the GUI 101. As shown in FIG. 3 view 300 shows the GUI 101 when the user/device has moved from start location 106 to a second location 302 along route 120. For example, an updated location of the user/user device may be received indicating that the user/user device is now located at point 302. In the example illustrated in FIG. 3, position indicator 302 indicates the progress the user has made along a previously calculated and displayed route. The location of position indicator 302 on route 120 corresponds to position indicator 301 on linear visual indicator 104. Position indicator 301 may be a circle (as shown in FIG. 3) or may be any shape including, but not limited to, a star, a square, and/or an arrow. Position indicator 301 may be displayed on linear visual indicator 104, next to it, below it, above it, and/or around it. Section 303 in linear visual indicator 104, the area to the left of the position indicator 301 may represent the route previously traversed by the user and/or user device. In the example shown in FIG. 3, a fourth shade/color on the map 102 or the linear visual indicator 104 may represent the traversed route. Additionally or alternatively, as the location of the user is updated, linear visual indicator 104 may be updated to represent only the area yet to be travelled (e.g., a yet un-travelled portion would be rescaled to encompass the fill length of the linear visual indicator) and there would be no indication of previously traversed route. (See FIG. 1 for an example) Additionally or alternatively, if it is determined that the current location of the user is no longer on the route (one update off route, certain distance from route, or certain length of time), the system may calculate a new route. In such a situation, the linear visual indicator 104 may reset with the new route encompassing the full length of the linear visual indicator (e.g., the current position at the far left of the linear visual indicator) or the new route may be scaled to fit between position indicator 301 and the far right (e.g., destination location 108) so that the traversed route remains visible.

Figure 4:
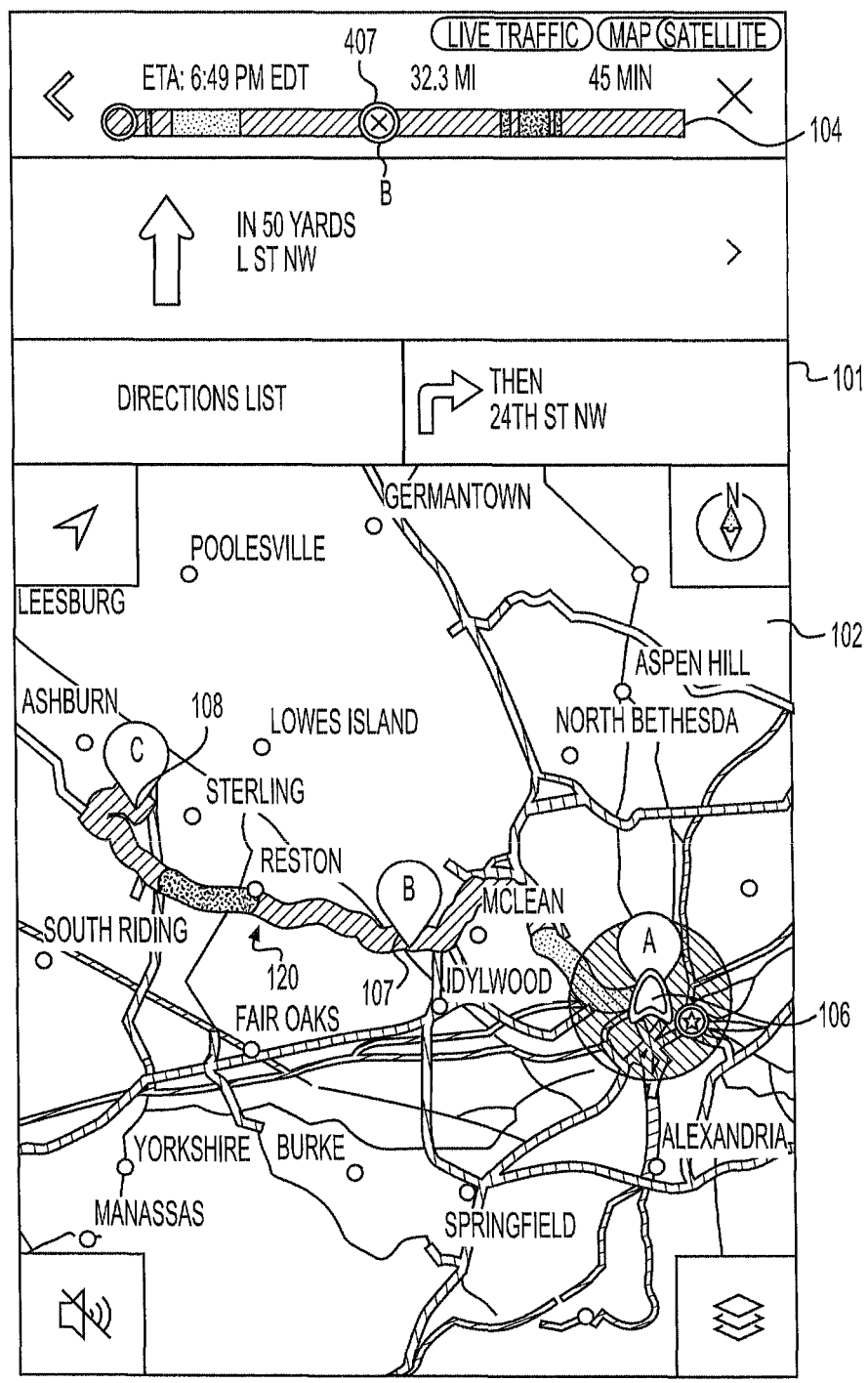
FIG. 4 is a schematic view of an exemplary GUI of a route with multiple destinations on a digital map and a linear visual indicator corresponding to the route, according to an exemplary embodiment of the present disclosure.

FIG. 4, shows a view 400 of the digital map 102 and the linear visual indicator 104 of the GUI 101. As shown in FIG. 4, view 400 shows the GUI 101 when the user has input multiple destination locations. In this example, the user input both location "B" 107 and location "C" 108 as destination locations (or "stops"). The user may access this function by selecting "Add a stop." Once the user inputs multiple stops/destination locations, a route may be calculated to direct the user to both locations. The route may be calculated to direct the user to each location in the order specified by the user (e.g., the user requests to go to point B before point C) or in the order deemed appropriate by the mapping server (e.g., point B is on the way to point C, so that will be the first stop). In the example illustrated in FIG. 4, the additional stop, location 107, is added to and indicated on linear visual indicator at position "B" 407. Additionally or alternatively, the linear visual indicator may depict the route conditions until the first stop, so point 407 would be on the far right of the linear visual indicator. Once an updated current location of the user/user device reached corresponding location 107, the linear visual indicator may change so that the far left is point B 407 and the far right is the second destination location, corresponding to location 108. Additionally or alternatively, like in FIG. 2, there may be two linear visual indicators, one displaying conditions from the start location to the first stop and the second displaying route conditions from the first stop to the second stop. It should be noted that the route and the linear visual indicator are not limited to two stops and may include as many stops as the user desires.

Figure 5:
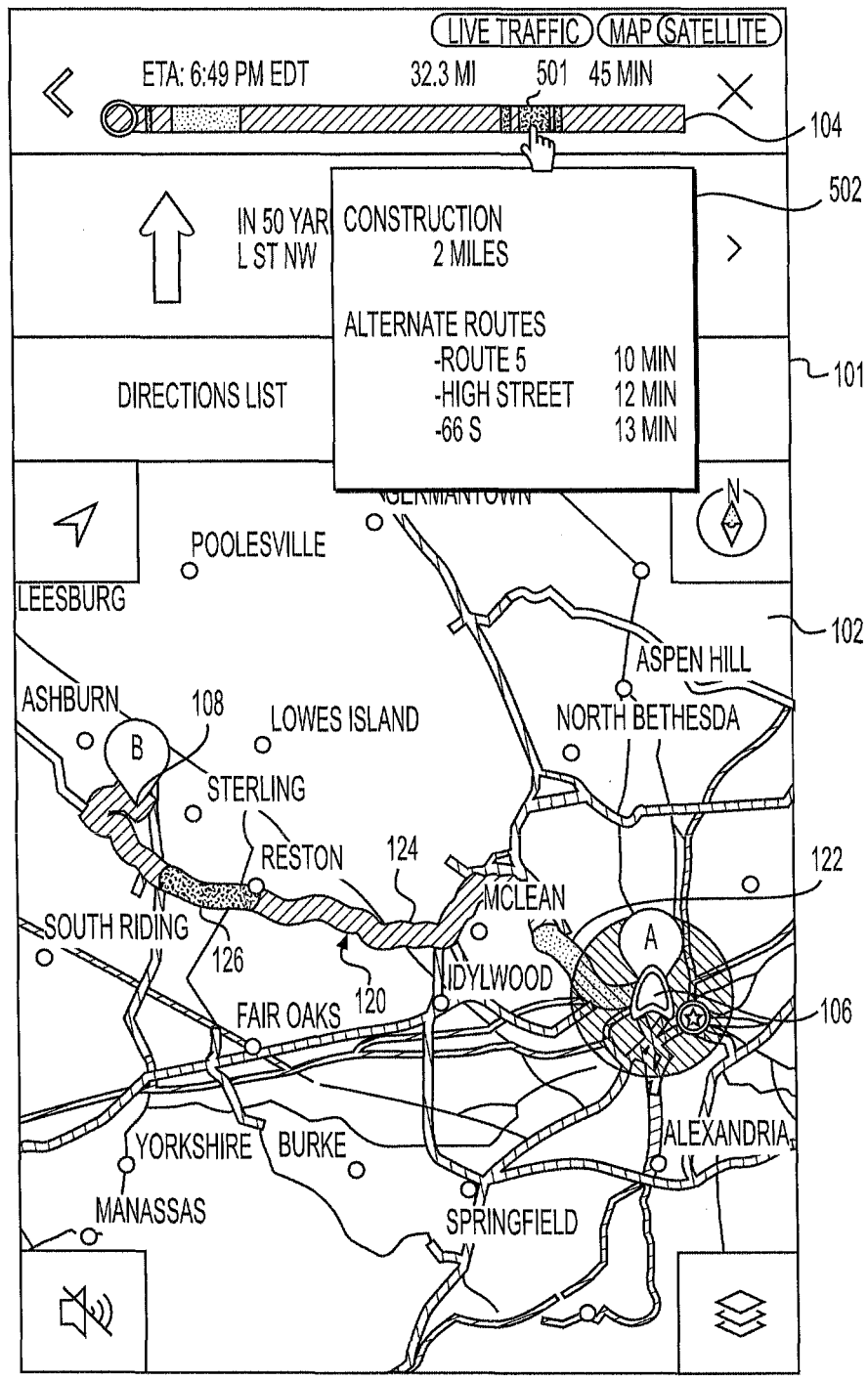
FIG. 5 is a schematic view of an exemplary GUI of a route on a digital map, an interactive linear visual indicator corresponding to the route, and a dropdown menu related to point along the interactive linear visual indicator, according to an exemplary embodiment of the present disclosure.

FIG. 5, shows a view 500 of the digital map 102 and the linear visual indicator 104 of the GUI 101. Points along the linear visual indicator 104 may be interactive. For example, a user may select point 501 along linear visual indicator 104. In the example illustrated in FIG. 5, this point may be displayed as red because its corresponding point 122 on route 120 is designated as red and/or "stop and go" traffic (e.g., the difference between the current speeds and the posted speed limit is greater than a second threshold, as described in further detail above, in FIG. 1). Once the user selects point 501, a new user element may appear, including but not limited to, dropdown menu 502. Dropdown menu 502 may include additional information regarding the route. For example, dropdown menu 502 may include information regarding the cause of the "stop and go" traffic (e.g., construction, one lane, rush hour, an accident), the length of the section designated as "stop and go," alternative routes that avoid some or all of the second state or third state traffic. The dropdown menu is not limited to traffic conditions and may include additional information, for example, the name of the town, the current weather, near-by dining options, etc. In the example of FIG. 5, the dropdown menu includes three alternative routes and the time each will take. The user may select any of the routes displayed: Route 5, High street, or 66 S. FIG. 5 is depicted as an example and the additional information may be accessed or displayed in any way. For example, the user may speak a command or the device may provide audio information. The information may be displayed as a new window, or the whole screen. Further, any information including weather and/or advertisements for local businesses may be displayed when a point is selected. If the user selects an alternative route, route 120 may be updated in any way. For example, as explained with respect to FIG. 3, the linear visual indicator may be reset so that the current location is the new start location 106. Additionally or alternatively, the new route may be scaled to fit between the current location on the linear visual indicator 105 and the destination location 108, and the aspects of the linear visual indicator between the initial start location 106 and the current location will be designated as the traversed state (e.g., displayed as gray).

Figure 6:
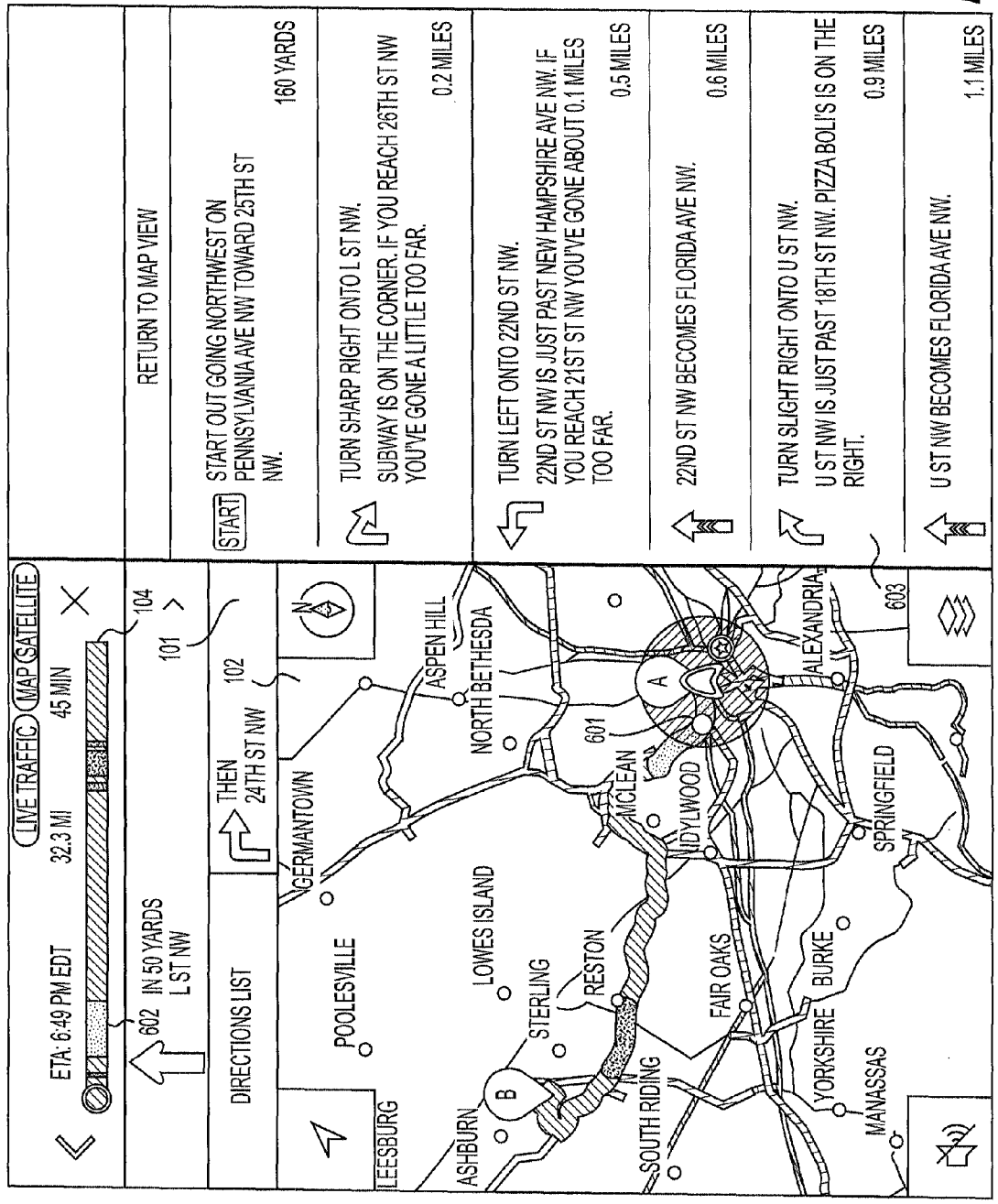
FIG. 6 is a schematic view of an exemplary GUI of a route on a digital map, a linear visual indicator corresponding to the route, and route directions, according to an exemplary embodiment of the present disclosure.

FIG. 6, shows a view 600 of the digital map 102, digital directions 103, and the linear visual indicator 104 of the GUI 101. Like the linear visual indicator in FIG. 5, points along digital map 102, digital directions 103, and the linear visual indicator 104 may be interactive. For example, a user may select point 602 along linear visual indicator 104. This point may correspond to location 601 on the digital map and/or direction 603 on the digital directions. By selecting this point on the linear visual indicator, the digital map may zoom in or move to corresponding location 601. Additionally or alternatively, by selecting point 602 on the linear visual indicator, the digital directions may "jump to" corresponding direction 603 or highlight that direction. In some implementations, a user may swipe the screen and/or "drag" a position indicator 301 (See FIG. 3) to a point on the linear visual indicator 104. As the swipe/dragging selects different points on along linear visual indicator 104, the digital map 102 may jumps to close-ups of corresponding locations along route 120. Similarly, points on the digital map and digital directions may be interactive.

Figure 7:
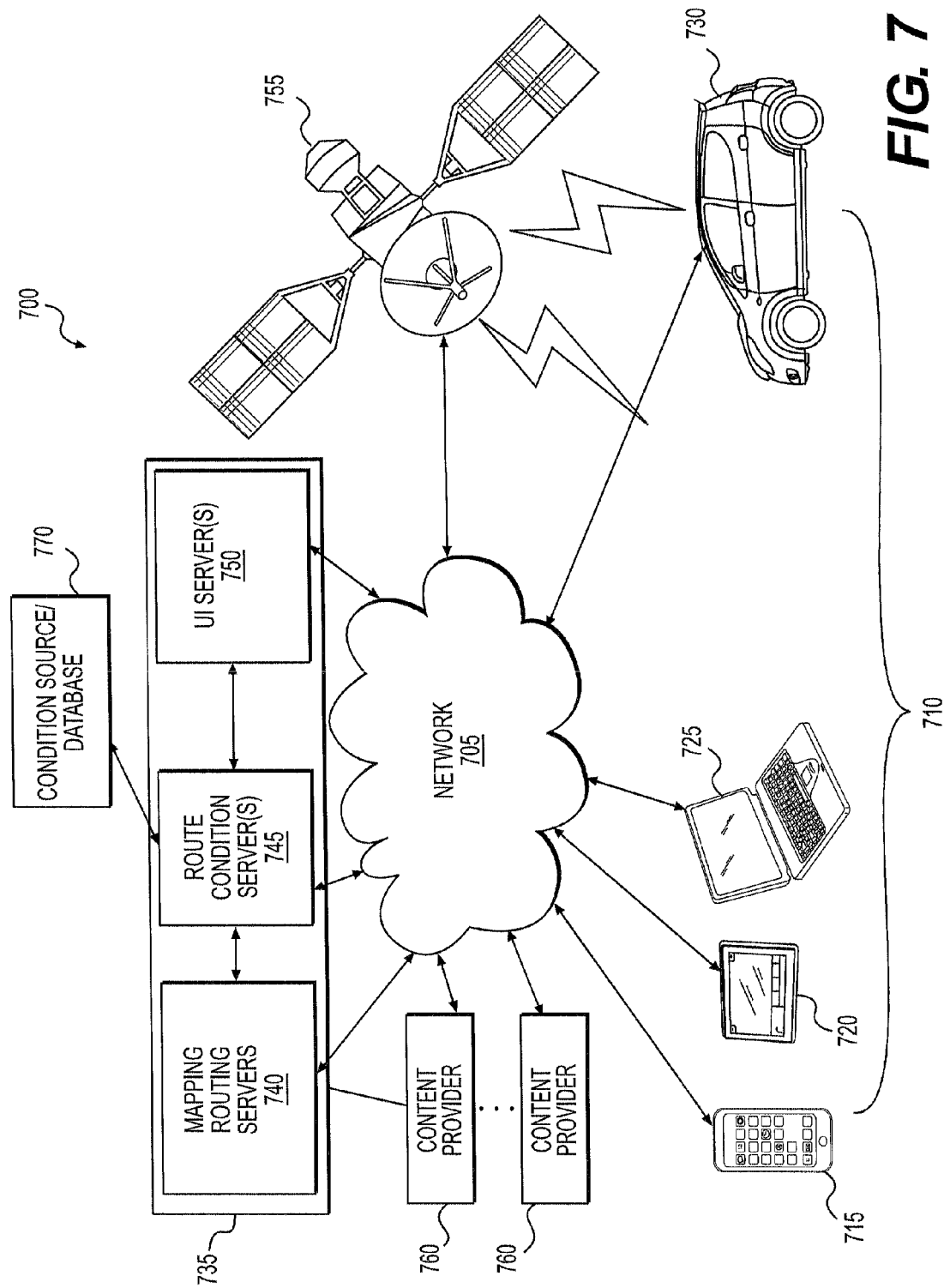
FIG. 7 is a block diagram of a communications system configured to present users with automatically generated dynamic routes and route conditions, according to an exemplary embodiment of the present disclosure.

FIG. 7 is a block diagram of a communications system 700 capable of accessing stored or third party traffic/condition data associated with streets, intersections, bike paths, etc. For example, the system 700 may access and retrieve the traffic or route condition data stored or developed on condition source or database 770 via a network 705, such as the Internet or other third party provider. The retrieved traffic and/or condition data may be used for display and/or processing by one or more user devices 710, such as a mobile device 715 (e.g., mobile phone, personal digital assistant, tablet computer), a GPS device 720, a computer (laptop, desktop, tablet) 725, an in-vehicle navigation system 730, and/or any device connected to a network 705, such as the Internet, according to an exemplary embodiment of the present disclosure.

In the example shown in FIG. 7, mobile electronic device 715 may be a smartphone, a personal digital assistant ("PDA"), a tablet computer, or other type of mobile computing device, such as a device having a touchscreen display. Mobile device 715 and computer 725 may each be equipped with or include, for example, a GPS receiver for obtaining and reporting location information, e.g., GPS data, via network 705 to and from any of servers 735 and/or one or more GPS satellites 755. GPS device 720 may be a dedicated GPS navigation device having an integrated GPS receiver for exchanging location information with GPS satellite(s) 755 for purposes of tracking a current geographic location of GPS device 720 and its user. GPS device 720 may be a portable or handheld GPS device. Vehicle navigation system 730 may be implemented as, for example, a GPS based in-dash navigation system integrated with the vehicle 730. Such an in-dash navigation system may provide various functions, including a navigation function, via a center console display installed within the vehicle.

However, it should be noted that each of user devices 710, including mobile device 715, GPS device 720, computer 725, and/or vehicle navigation system 730, may be implemented using any type of electronic device configured to send and receive data, including location data (e.g., in the form of latitude and longitude coordinates), to and from a system of servers 735 over network 705. The user input device(s) may include any type or combination of input/output devices, such as a display monitor, touchpad, touchscreen, microphone, camera, keyboard, and/or mouse.

Furthermore, it should be noted that any of various techniques may be used to derive geographic location information for any of user devices 710, particularly in cases where GPS data may not be available, for example, in urban canyons or other locations where line-of-sight to GPS satellites may not be feasible. Examples of other techniques that may be used for deriving location information for any of user devices 710 include, but are not limited to, cell identification (e.g., using Cell ID), cellular tower triangulation, multilateration, Wi-Fi, or any other network or handset based technique for deriving location information for a mobile device. The various user devices 710 may also communicate with each other by any suitable means (e.g., via Wi-Fi, radio frequency (RF), infrared (IR), Bluetooth, Near Field Communication, or any other suitable means) to send and receive location and other information. For example, a mobile device 715 may communicate with GPS device 720 or vehicle navigation system 730.

The user device 710 may receive information via the network 705 from the system of servers 735, having one or more servers such as mapping servers 740, route condition servers 745, user interface servers 750, and/or any other suitable servers. Each server may access the condition source/database 770 to retrieve traffic/condition data, such as the data regarding current speeds or weather from third party providers. Each server may include memory, a processor, and/or a database. For example, the mapping server 740 may have a processor configured to retrieve mapping information and generate routing information, route condition server 745 may have database that is a subset of condition source/database 770 or a database of historic average speeds or speed limits, and a processor configured to retrieve route condition information, provide route condition information, and calculate the difference between the current average speeds and historic averages/speed limits for each point along the route. The user interface server 750 may be configured to receive and process user input, such as route or condition preferences. The satellite 755 may be configured to send and receive location and other information to the server system 735 and user devices 710.

The various user devices 710 may communicate with each other by any suitable means (e.g., via the network 705, Bluetooth, Near Field Communication, or any other suitable means) to send and receive location and other information. For example, a mobile device 715 may communicate with a GPS device 720, 730 in communication with the satellite 755.

The mapping server 740 may receive information regarding a user's trip, such as a start location, destination location, and any user route preferences directly from the user device 710 via the network 705 or indirectly via the user interface server 750. The mapping server 740 may save the information in memory, such as a computer readable memory.

The mapping server 740 also may be in communication with one or more other servers, such as the route condition server 745 and/or external servers such as servers of content providers 760. The content providers 760 may include advertisers, news sources, entities affiliated with point along the route (e.g., local markets, political ads), review sites, etc. The information provided by content providers 760 may be displayed along linear visual indicator 104. Additionally or alternatively, the information provided by content providers 760 may be displayed in dropdown menu 502. For example, an interactive gas pump may be displayed along linear visual indicator 104. In such an embodiment, the content provider 760 may be a gas station owner providing advertisements and information regarding fuel prices for gas stations along the route. In other embodiments, the content provider may be restaurants providing advertisement information regarding seasonal menu items and locations. Other examples may include retail stores, amusement parks, etc. providing advertisements about their locations. In addition, the mapping server 740 may include data from other users, traffic reports, weather reports, police reports, and/or any other source of relevant information. The route condition server 745 may include traffic information, weather details, road constructions, etc. The mapping server 740 and/or the route condition server 745 may process the information for display on the user device 710.

Each server in the system of servers 735, including mapping server 740, route condition server 745, and UI server 750 may each represent any of various types of servers including, but not limited to a web server, an application server, a proxy server, a network server, or a server farm. Each server in the system of servers 735 may be implemented using, for example, any general-purpose computer capable of serving data to other computing devices including, but not limited to, user devices 710 (including mobile device 715, GPS device 720 and computer 725) or any other computing device (not shown) via network 705. Such a general-purpose computer can include, but is not limited to, a server device having a processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid-state disk (SSD) or flash memory; optical disc storage; or magneto-optical disc storage. Software may include one or more applications and an operating system. Hardware can include, but is not limited to, a processor, memory, and graphical user interface display. Each server may also have multiple processors and multiple shared or separate memory components that are configured to function together within, for example, a clustered computing environment or server farm.

In an example, each of user devices 710 may be configured to execute a mobile client application for providing various functions of a mapping service hosted at mapping server 740. Examples of such functions may include, but are not limited to, viewing and manipulating digital maps, route planning and navigation, and creating and displaying a linear representation of conditions along the route. Such conditions may include, for example and without limitation, traffic, weather, multiple stops, alternative routes, safety conditions, etc. The client application executable at each user device 710 may be configured to process and execute instructions and save data in memory. The client application may also be configured to provide the various mapping functions to the user through a GUI, such as GUI 100 presented via a display, e.g., capacitive touchscreen display, coupled to each user device 710. The client application executable at each user device may be a standalone mobile application or may be configured to execute within, for example, a web browser based on web page data loaded within the browser or similar application executable at each of user devices 710.

In a further example, the above-described mapping client application and/or mapping service hosted at mapping server 740 may be configured to communicate with route condition server 745 over network 705 for purposes of sending and receiving information related to the conditions on or around the selected route. Each of mapping server 740 and route condition server 745 may be communicatively coupled to, for example, a condition source/database 770 which may be used to store traffic conditions, speed limits, average speeds, weather, construction zones, alternative routes, etc.

As will be described in further detail below, such a condition source/database 770 may be used (e.g., by route condition sever 745 and/or mapping server 740) to store and retrieve data related to certain conditions along the route. The data associated with the routes or points along the route may include, for example, current speeds, historic average speed, posted speed limits, constructions zones, speed cameras, location of police officers, stopped vehicles, accidents, weather, special events, and/or rush hour.

To implement navigation features of the mobile application, each user device 710 may receive location data from one or more servers in the system of servers 735 via network 705 and/or satellites 755. Such location data may include information regarding a user's trip, such as a start or origin location, travel route, and a destination location. The mobile application may be any machine-readable code for executing instructions, such as software, configured to be processed by each user device 710. The mobile application may have been downloaded via the network 705 and installed within a memory of each user device 710.

Figure 8:
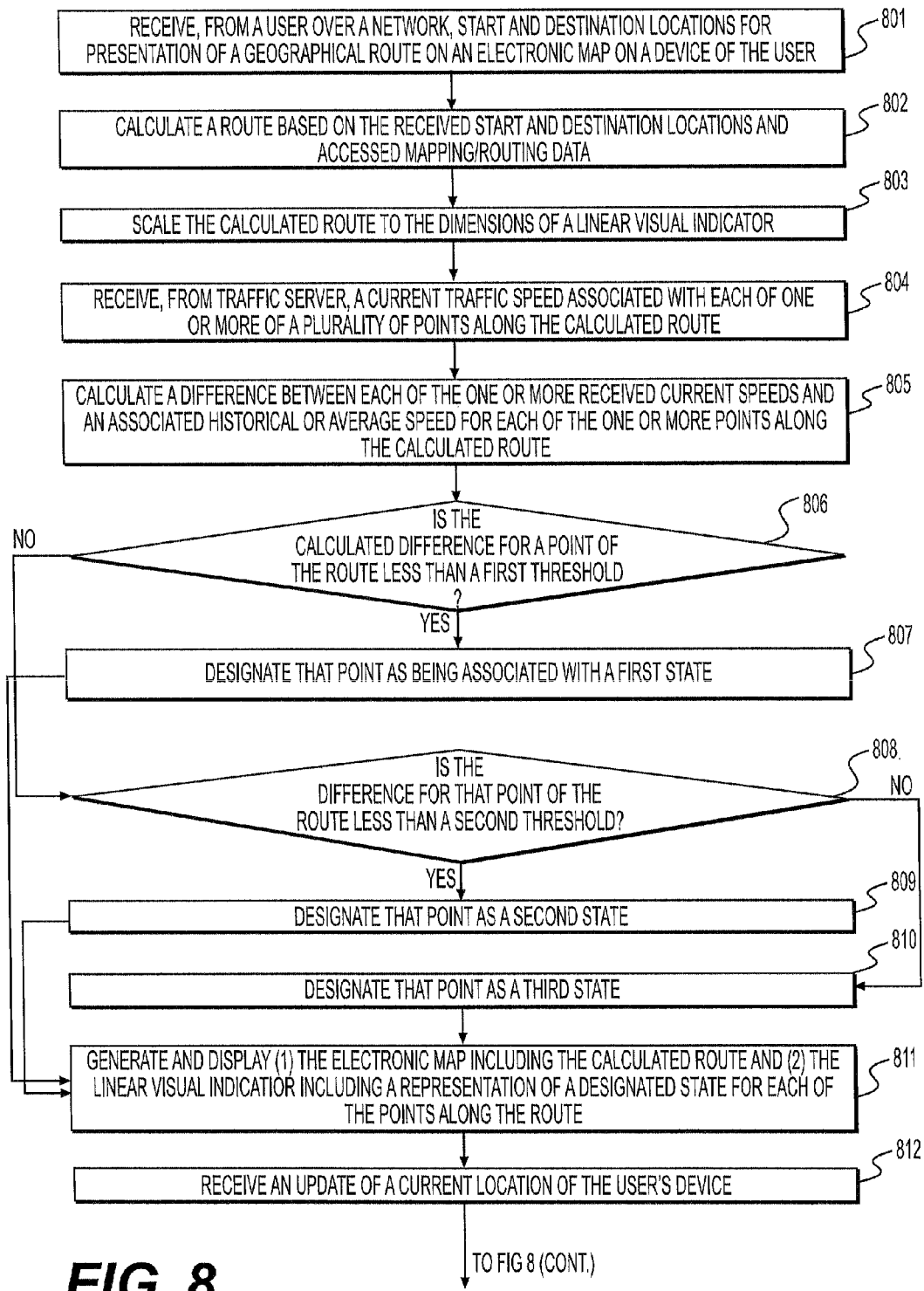
FIG. 8 is a flow diagram of an exemplary method of calculating a route and traffic conditions along the route, and displaying those traffic conditions on the digital map and the linear visual indicator, according to an exemplary embodiment of the present disclosure.
Figure 8:
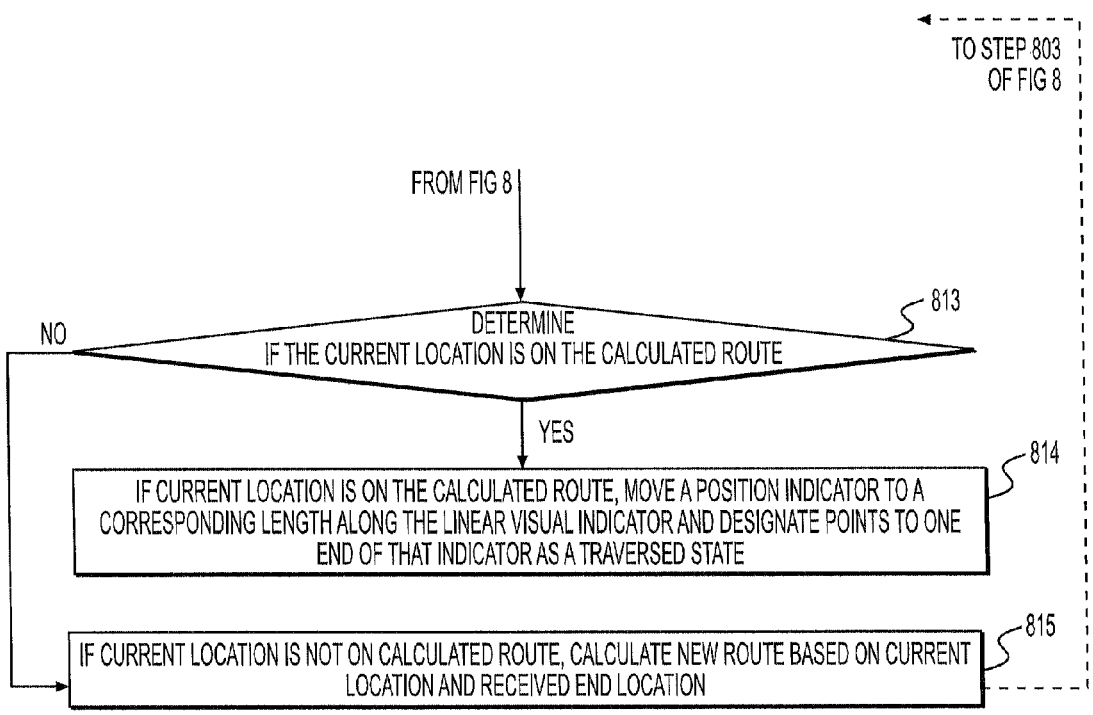

FIG. 8 is a process flow diagram of an exemplary method 800 for generating and displaying a linear visual indicator of route conditions. For purposes of discussion, method 800 will be described using system 700 of FIG. 7 (including mapping server 740, route condition server 745, and condition database/source 770), as described above, but method 800 is not intended to be limited thereto. As shown in FIG. 8, method 800 includes steps 801-815. However, it should be noted that method 800 may include more or fewer steps as desired for a particular implementation. In an example, one or more of the above-listed steps of method 800 may be executed by route condition server 745 of FIG. 7 or mapping server 740 of FIG. 7, as described above. However, method 800 is not intended to be limited thereto, and the steps of method 800 may be performed by any server or other type of computing device having at least one processor, a memory, and a network communication interface for sending and receiving information from one or more user devices. Method 800 discloses determining and displaying a linear depiction of traffic conditions, but this method is not limited hereto. This method may be used to depict any route condition, including but not limited to, weather, speed cameras, construction, time of day, etc.

Method 800 may begin in step 801, which may include receiving from a user over a network, start and destination locations for presentation of a geographical route on an electronic map on a device of the user. The user may input both locations, or for example, the start location may be the current location of the device. In step 802, a route may be calculated based on the received start and destination locations and accessed mapping/routing data. This route may be calculated by mapping server 740 of FIG. 7. Step 803 may include scaling the calculated route to the dimension of a linear visual indicator. This linear visual indicator may, for example, be sized so as to display the entire visual representation to the user in one screen, without adjustment/zooming by the user. In step 804, a current condition associated with each of one or more of a plurality of points along the calculated route may be obtained or calculated. In the case of method 800, this condition may be the current average speeds of vehicles/devices at each point along the route. This data may be received from condition source/database 770 or FIG. 7, a traffic server, or third party provider. In step 805, the current speed received for each of the plurality of points may be compared to historical or average speeds, or speeds limits for each of the one or more points along the calculated route. The historical/average speeds or the speed limits may be stored in a database, such as, for example, condition source/database 770 or a server, such as, for example, route condition server 745.

In step 805, the difference between the received current speed and the historical/average speeds may be calculated for each point. Step 806 may include, for example, determining whether the calculated difference for a point of the route is less than a first threshold. If it is determined in step 806 that the calculated difference is less than a first threshold, that point may be designated as a first state. In some implementations, the first state may represent "normal" traffic and the corresponding point on the linear visual indicator may be, for example, green or blue in color. It should be noted that in some implementations, there may be only two states. In such an implementation, if it is determined in step 806, that the calculated difference is not less than a first threshold, it may be designated as a second state. In method 800, however, if it is determined in step 806 that the calculated difference is not less than a first threshold, method 800 may proceed to step 808, which may include determining whether the difference for that point of the route is less than a second threshold. If in step 808, it is determined that the difference is less than a second threshold, that point may be designated as a second state. The second state may indicate "slow" traffic and that point may be yellow in color on linear visual indicator 104. If in step 808, it is determined that the difference is not less than a second threshold, method 800 may proceed to step 810. In step 810, that point may be designated as a third state. In some implementations, the third state may indicate that it is "stop and go" traffic and that point on the linear visual indicator 104 is displayed as red. In some implementations, if the current speed at a certain point along the route is unavailable or inaccessible from condition source/database 770 or a traffic server, etc., that point may be designated as an unknown state. If a point is designated as an unknown state, it may have a unique color or it may be displayed as blue, like "normal" traffic points.

Once all the points along the route have a designated state (including "unknown" state), method 800 may proceed to step 811 and may generate and display (1) the electronic map (map 102) including the calculated route and (2) the linear visual indicator including a representation of a designated state for each of the points along the route. In step 812, an updated current location of the user's device may be received. If it is determined in step 813 that the current location is on the calculated route, a position indicator 301 may be moved to a corresponding length along the linear visual indicator and points to one end of that indicator are designated as a traversed state (as described above in relation to FIG. 3). If in step 813, it is determined that the current location is not on the calculated route, a new route may calculated based on the current location and end location received in step 801. Method 800 may then proceed to 803, using the new calculated route.

Figure 9:
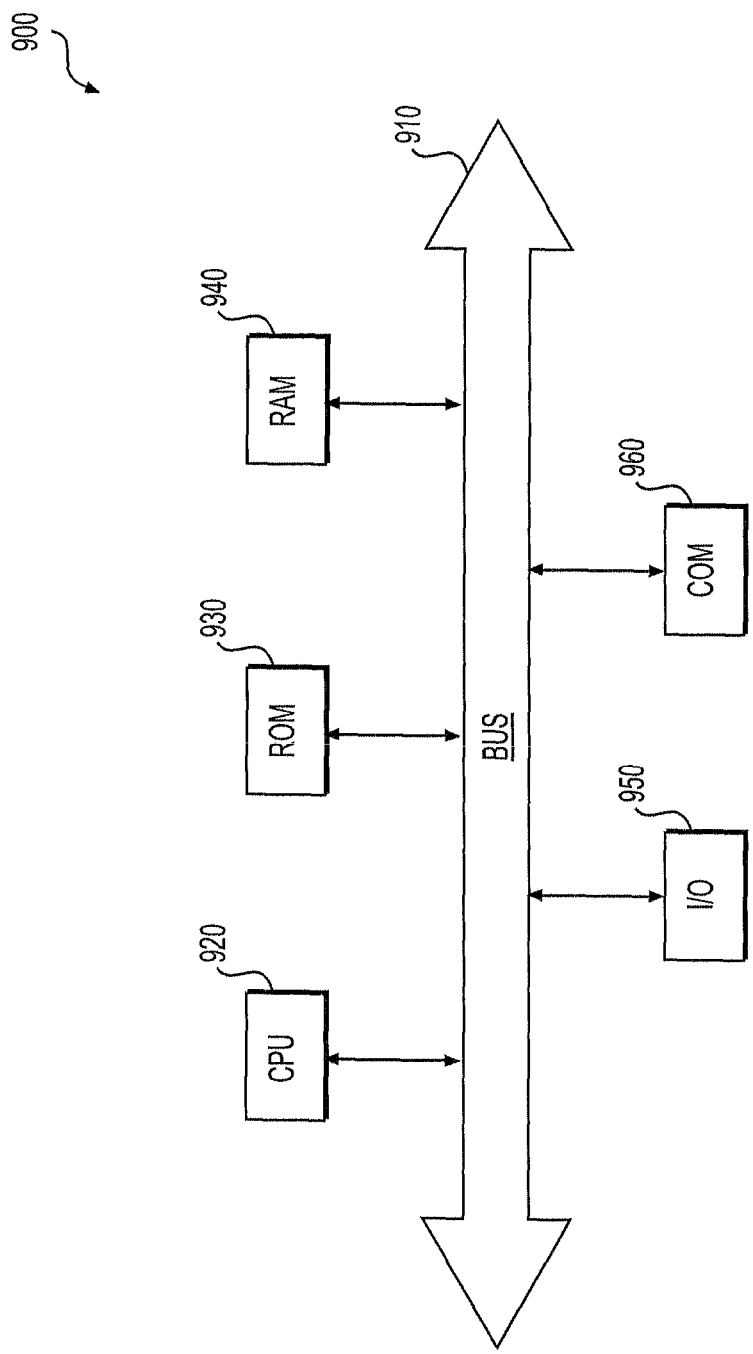
FIG. 9 is a block diagram of an exemplary computer system in which embodiments of the present disclosure may be implemented.

FIG. 9 provides a functional block diagram illustration of general-purpose computer hardware platforms. FIG. 9 illustrates a network or host computer platform 900, as may typically be used to implement a server like the mapping server system 740. It is believed that those skilled in the art are familiar with the structure, programming, and general operation of such computer equipment and as a result, the drawings should be self-explanatory.

A platform for a server or the like 900, for example, may include a data communication interface for packet data communication 960. The platform may also include a central processing unit (CPU) 720, in the form of one or more processors, for executing program instructions. The platform typically includes an internal communication bus 910, program storage, and data storage for various data files to be processed and/or communicated by the platform such as ROM 930 and RAM 940. The hardware elements, operating systems, and programming languages of such equipment are conventional in nature, and it is presumed that those skilled in the art are adequately familiar therewith. The server 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing a visual representation of conditions along a calculated route, the method comprising:
   receiving, at a computer processor from a user over an electronic network, a start location and a destination location;
   calculating, by the computer processor, a route based on the received start and destination locations;
   scaling, using the computer processor, the calculated route to dimensions of a first bar-shaped linear visual indicator of the calculated route;
   receiving or calculating, using the computer processor, a first condition associated with at least one of a plurality of points along the calculated route;
   generating, using the computer processor, and displaying on a device of the user an electronic map including at least a portion of the calculated route;
   generating, using the computer processor, and displaying on the device, one or more turn-by-turn directions indicia corresponding to the electronic map;
   generating, using the computer processor, and displaying on the device, while displaying the one or more turn-by-turn directions indicia, the first bar-shaped linear visual indicator parallel to a top of the displayed electronic map, the first bar-shaped linear visual indicator being divided into representative segments according to the scaling, at least one of the representative segments including a visual representation of the first condition associated with one or more of a plurality of points along the calculated route of the respective representative segment, wherein a pattern, shade, or color of at least one of the representative segments of the first bar-shaped linear visual indicator matches a pattern, shade, or color of a respective portion of the calculated route displayed on the electronic map;
   generating, using the computer processor, a second bar-shaped linear visual indicator;
   scaling the second bar-shaped linear visual indicator to overlap a corresponding portion of the first bar-shaped linear visual indicator;
   receiving or calculating, using the computer processor, a second condition associated with each of the one or more of the plurality of points along the calculated route; and
   displaying the second bar-shaped linear visual indicator on the device, while displaying the first bar-shaped linear visual indicator, the second bar-shaped linear visual indicator comprising one or more visual representations of the second condition associated with each of the one or more of the plurality of points along the calculated route.

2. The method of claim 1, wherein the first or second condition is a weather condition.

3. The method of claim 2, wherein the weather condition is determined by estimating weather conditions at an estimated time of arrival at each corresponding point along the calculated route.

4. The method of claim 1, wherein the first or second condition is a traffic condition.

5. The method of claim 4, further comprising:
   receiving current average speeds for each of the one or more of the plurality of points along the calculated route for calculating the first or second condition.

6. The method of claim 5, further comprising:
   calculating a difference between the received current average speeds for each of the one or more of the plurality of points and speed limits for each of the one or more of the plurality of points.

7. The method of claim 5, further comprising:
   calculating a difference between the received current average speeds for each of the one or more of the plurality of points and historical average speeds for each of the one or more of the plurality of points.

8. The method of claim 7, further comprising:
   determining whether the difference between the received current average speeds for each of the one or more of the plurality of points and the historical average speeds for each of the one or more of the plurality of points is less than a first threshold.

9. The method of claim 8, wherein, if the difference is less than the first threshold for a point of the one or more of the plurality of points, the point is designated a first state and a first visual representation is displayed on the first or second bar-shaped linear visual indicator.

10. The method of claim 8, wherein, if the difference is not less than the first threshold, determining whether the difference between the received current average speeds for each of the one or more of the plurality of points and the historical average speeds for each of the one or more of the plurality of points is less than a second threshold.

11. The method of claim 10, wherein, if the difference is less than the second threshold for a point of the one or more of the plurality of points, the point is designated a second state and a second visual representation is displayed on the first or second bar-shaped linear visual indicator.

12. The method of claim 10, wherein, if the difference is not less than the second threshold for a point of the one or more of the plurality of points, the point is designated a third state and a third visual representation is displayed on the first or second bar-shaped linear visual indicator.

13. The method of claim 1, further comprising:
   receiving a stop location; and
   calculating a route based on the start location, the stop location, and the destination location.

14. The method of claim 1, further comprising:
   receiving a current location of the device of the user; and
   determining whether the current location is on the calculated route;
   if the current location is on the calculated route, moving a position indicator to a corresponding length along the first or second bar-shaped linear visual indicator and designating any of the plurality of points to one end of the position indicator as a traversed state; and
   if the current location is not on the calculated route, calculating a new route based on the current location and received destination location.

15. The method of claim 1, wherein at least one of the first and second bar-shaped linear visual indicators is interactive.

16. The method of claim 1, further comprising:
   receiving a request from the user for additional information;
   obtaining additional information; and
   displaying the additional information.

17. The method of claim 16, wherein the additional information comprises a description of one or more alternative routes.

18. The method of claim 16, wherein the additional information comprises a distance that a determined condition persists along the calculated route.

19. A system for providing a linear visual indicator of route conditions, the system including:
- a data storage device storing instructions for providing a linear visual indicator of route conditions;
- a processor configured to execute the instructions to perform a method including:
- receiving a start location and a destination location;
- calculating a route based on the received start and destination locations;
- scaling the calculated route to dimensions of a first bar-shaped linear visual indicator of the calculated route;
- receiving or calculating a first condition associated with at least one of a plurality of points along the calculated route;
- generating and displaying an electronic map including at least a portion of the calculated route;
- generating and displaying one or more turn-by-turn directions indicia corresponding to the electronic map;
- generating and displaying, along with the one or more turn-by-turn directions indicia, the first bar-shaped linear visual indicator parallel to a top of the displayed electronic map, the first bar-shaped linear visual indicator being divided into representative segments according to the scaling, at least one of the representative segments including a visual representation of the first condition associated with one or more of a plurality of points along the calculated route of the respective representative segment, wherein a pattern, shade, or color of at least one of the representative segments of the first bar-shaped linear visual indicator matches a pattern, shade, or color of a respective portion of the calculated route displayed on the electronic map;
- generating a second bar-shaped linear visual indicator;
- scaling the second bar-shaped linear visual indicator to overlap a corresponding portion of the first bar-shaped linear visual indicator;
- receiving or calculating a second condition associated with each of the one or more of the plurality of points along the calculated route; and
- displaying the second bar-shaped linear visual indicator on a device along with the first bar-shaped linear visual indicator, the second bar-shaped linear visual indicator comprising one or more visual representations of the second condition associated with each of the one or more of the plurality of points along the calculated route.

20. A computer readable medium storing instructions that, when executed by a computer, cause the computer to perform a method of generating and displaying a visual linear indicator of route conditions, the method including:
- receiving a start location and a destination location;
- calculating a route based on the received start and destination locations;
- scaling the calculated route to dimensions of a first bar-shaped linear visual indicator of the calculated route;
- receiving or calculating a first condition associated with at least one of a plurality of points along the calculated route;
- generating and displaying an electronic map including at least a portion of the calculated route;
- generating and displaying one or more turn-by-turn directions indicia corresponding to the electronic map;
- generating and displaying, along with the one or more turn-by-turn directions indicia, the first bar-shaped linear visual indicator parallel to a top of the displayed electronic map, the first bar-shaped linear visual indicator being divided into representative segments according to the scaling, at least one of the representative segments including a visual representation of the first condition associated with one or more of a plurality of points along the calculated route of the respective representative segment, wherein a pattern, shade, or color of at least one of the representative segments of the first bar-shaped linear visual indicator matches a pattern, shade, or color of a respective portion of the calculated route displayed on the electronic map;
- generating a second bar-shaped linear visual indicator;
- scaling the second bar-shaped linear visual indicator to overlap a corresponding portion of the first bar-shaped linear visual indicator;
- receiving or calculating a second condition associated with each of the one or more of the plurality of points along the calculated route; and
- displaying the second bar-shaped linear visual indicator on a device along with the first bar-shaped linear visual indicator, the second bar-shaped linear visual indicator comprising one or more visual representations of the second condition associated with each of the one or more of the plurality of points along the calculated route.

* * * * *